United States Patent [19]
Tsurushima

[11] 3,883,692
[45] May 13, 1975

[54] DECODER APPARATUS WITH LOGIC CIRCUIT FOR USE WITH A FOUR CHANNEL STEREO

[75] Inventor: Katsuaki Tsurushima, Yokohama, Japan

[73] Assignee: Sony Corporation, Tokyo, Japan

[22] Filed: June 7, 1973

[21] Appl. No.: 367,886

Related U.S. Application Data

[63] Continuation-in-part of Ser. No. 272,439, July 17, 1972, Pat. No. 3,786,193.

[30] Foreign Application Priority Data

June 16, 1972 Japan ............................... 47-60100

[52] U.S. Cl. ............... 179/1 GQ; 179/100.4 ST; 179/100.1 TD

[51] Int. Cl. ............................................. H04r 5/00

[58] Field of Search 179/1 GQ, 100.4 ST, 100.1 TD, 179/15 BT

[56] References Cited

UNITED STATES PATENTS

| | | | |
|---|---|---|---|
| 3,784,744 | 1/1974 | Bauer | 179/1 GQ |
| 3,786,193 | 1/1974 | Tsurushima | 179/1 GQ |

*Primary Examiner*—Kathleen H. Claffy
*Assistant Examiner*—Thomas D'Amico
*Attorney, Agent, or Firm*—Lewis H. Eslinger; Alvin Sinderbrand

[57] ABSTRACT

A wavematching logic circuit and a front-back logic circuit for use with a four channel stereo decoder of the type which converts two composite signals $L_T$ and $R_T$ into four output signals containing dominant signal components $L_F'$, $R_F'$, $L_B'$ and $R_B'$, respectively, with each of the output signals further including subdominant signal components as crosstalk. The wavematching logic circuit includes a plurality of full wave rectifiers for separately rectifying each of the four output signals, a first subtracting circuit for producing a signal representative of the difference between the rectified $L_F'$ and $R_F'$ output signals and a second subtracting circuit for producing an output signal representative of the difference between the rectified $L_B'$ and $R_B'$ output signals. The difference signal outputs are compared in a comparataor which generates first and second control signals each representative of the difference of the difference signals, but of opposite polarity. The $L_F'$ and $R_F'$ output signals are also supplied to a summing means and to a differencing means whose outputs are separately full wave rectified and applied to a second comparator. The outputs of the second comparator are third and fourth control signals of opposite polarity. The third control signal is added to the first control signal and applied to control the gains of first and second variable amplifiers whose inputs are the $L_F'$ the $R_F'$ output signals from the decoder. The fourth control signal is added to the second control signal and applied to control the gains of third and fourth variable gain amplifiers whose inputs are the $L_B'$ and $R_B'$ output signals from the decoder. The third and the fourth output signals from the front-back logic circuit are also applied to control two semiconductive mixing means connected separately between the outputs of the first and second variable amplifiers and the outputs of the third and fourth variable amplifiers, respectively.

8 Claims, 11 Drawing Figures

DECODER APPARATUS WITH LOGIC CIRCUIT FOR USE WITH A FOUR CHANNEL STEREO

CROSS-REFERENCE TO RELATED APPLICATION

This application is a continuation-in-part of my co-pending application Ser. No. 272,439 filed July 17, 1972, now U.S. Pat. No. 3,786,193 entitled MULTISIGNAL TRANSMISSION APPARATUS and having the same assignee as the present application.

BACKGROUND OF THE INVENTION

The invention relates to a multi-signal transmission apparatus and more particularly to improved decoding and reproduction by a plurality of loudspeakers to give a listener a highly realistic multi-channel sound program.

A so-called matrix, four channel stereo system has heretofore been proposed in which four original sound signals (which, for convenience are identified as $L_F$, $L_B$, $R_F$ and $R_B$ for "left front", "left back", "right front" and "right back", respectively) are converted into signals of only two channels by matrix networks called encoders for transmission or recording on conventional two channel media such as FM multiplex transmission or magnetic tape recording. In order to reproduce the encoded signals from the two channel media they are decoded to four signals by matrix networks which are called decoders.

It is preferred that the corresponding original sound signals $L_F$, $L_B$, $R_F$ and $R_B$ be reproduced only from separate loudspeakers. With such matrix four channel stereo systems, however, in addition to the corresponding original sound signals another sound signal is reproduced from another loudspeaker at the same time in the form of crosstalk, which is obviously undesirable because it deteriorates from the separation of the signals.

It has been proposed to eliminate this undesirable crosstalk by the use of logic circuits. One type of such a logic circuit is referred to as "wavematching logic." The basis of wavematching logic is that the signals which are reproduced at opposite ends of the room from individual corner signals are equal in amplitude and are in quadrature with each other. The wavematching logic recognizes this condition and makes the judgment that a pair of equal signals, when exactly at 90° with respect to each other and when present at only one end of the room represent transferred signals which should be attenuated. By selecting appropriate junctions of the decoder matrix, the quadrature relationship is changed to one defining an in- or out-of-phase condition which is more easily identified than the quadrature relationship. One problem with this sort of circuit is that the wavematching logic must be connected to the internal circuitry of the decoder and cannot be solely connected to the input or output terminals of the decoder.

In recent years it has been the practice to try to design such decoders to be easily manufacturable as integrated circuits. The use of such wavematching logic circuits, however, requires that extra terminals must be provided on the integrated circuit decoder. The cost of the integrated circuit is more or less directly proportional to the number of terminals required and thus the use of some prior art wavematching logic circuits which require extra terminals in the integrated circuit decoder increase its cost.

One prior art integrated circuit, wavematching logic circuit which attempts to remedy this disadvantage is described in an article entitled "Discrete vs. SQ Matrix Quadraphonic Disc," published in the July 1972 issue of *Audio* at pp. 18–26. In the wavematching logic circuit described in reference to FIG. 10 of that article the inputs to the logic circuit are obtained from the outputs of the decoder and used to control the gains of variable gain amplifiers separately connected to the outputs of the decoder. However, as will be explained in greater detail hereinafter the wavematching logic circuit does not produce an output control signal to attenuate the output signals from the decoder when there is present a center front or a center back signal. It is necessary to provide additional logic circuits known as front-back logic circuits to permit these locations to be recognized. An example of such a front-back logic circuit is described in a C.B.S. Laboratories paper "SQ Logic Decoder — Theory of Operation," by R. G. Allen and B. B. Bauer, dated May 1, 1972. In such a front-back logic circuit, however, it is not possible in response to a center front ($C_F$) signal, for example, to simultaneously increase the gains of the amplifiers of the left and right front signals ($L_F$ and $R_F$) and at the same time attenuate the $C_F$ signal which is also present in the rear sound signal channels without also attenuating ghe dominant $L_B$ and $R_B$ signals in the rear sound signal channels.

A description of another type of wavematching logic circuit is given in my co-pending patent application, U.S. Ser. No. 272,439, filed July 17, 1972, now U.S. Pat. No. 3,786,193 and having the same assignee as the present application. In that application a logic circuit whose action is based on wavematching and amplitude comparison techniques is disclosed. In the wavematching logic circuit, as shown in FIG. 3 of that application, the undesirable out-of-phase subdominant signals are eliminated by the wavematching logic circuit, however, center front and center back signals, which are in quadrature with each other, are not eliminated.

In order to eliminate the undesired center front and center back signals so that the wavematching circuit will operate properly a pair of time constant circuits having a very short time constant would have to be connected within the wavematching logic circuit so that the center front and center back signals would be effectively integrated and then cancelled by the differencing portions of the wavematching logic.

The disadvantage of such a modification to the circuit in my above-identified prior application is that the control signal derived from the wavematching logic is also delayed by the operation of the time constant circuit and a quick response is thereby prevented. This interferes with the crosstalk cancelling properties of the wavematching logic circuit.

SUMMARY OF THE INVENTION

The above and other disadvantages are overcome by the present invention of a multisignal decoding apparatus of the type which receives first and second composite signals $L_T$ and $R_T$, respectively, containing dominant left front ($L_F$) and right front ($R_F$) signal components and each including subdominant left back ($L_B$) and right back ($R_B$) signal components, the $L_B$ signal components having substantially equal magnitude and being in substantially lagging quadrature relationship with each other in the $L_T$ and $R_T$ composite signals, respectively, the $R_B$ signal components having substantially equal magnitude and being in substantially leading quadrature relationship with each other in the $L_T$ and $R_T$ composite signals, respectively, the composite $L_T$ and $R_T$ signals being converted by the decoding apparatus into first, second, third and fourth separate output signals predominantly containing $L_F$, $R_F$, $L_B$ and $R_B$ signals, respectively. The first and second decoding output signals contain subdominant signal components of the $L_B$ and $R_B$ signal which are in quadrature relationship with each other and in phase opposition to each other between the first and second output signals, the third and fourth output signals containing subdominant lower amplitude, quadrature related $L_F$ and $R_F$ signal components, respectively, which are quadrature related and in phase opposition to each other between the third and fourth output signals. Variable transmission means, such as variable gain amplifiers, are connected to first, second, third and fourth output terminals of the decoder. Logic means for eliminating crosstalk are provided, including first logic means having first, second, third and fourth input terminals separately connected to the first, second, third and fourth output terminals of the decoder, respectively, means for separately rectifying the first, second, third and fourth input signals to the first logic means, means for subtracting the second rectified input signal from the first rectified input signal to produce a first difference signal and for subtracting the fourth rectified input signal from the third rectified input signal to produce a second difference signal, and means for comparing the first and second difference signals for producing first and second control signals of opposite polarities. Separate input terminals of a second logic means are connected to the first and second input terminals of the first logic means. The second logic means further includes means for producing a signal representative of the sum of the first and second output signals and a signal representative of the difference of the first and second output signals, means for separately rectifying these latter sum and difference signals and means for comparing the amplitudes of the rectified sum and difference signals to produce third and fourth control signals of opposite polarities. Means are further provided for combining the first and third control signals to control the gains of first and second variable gain amplifiers whose inputs are supplied with the first and second output signals of the decoder and for combining the fourth and second control signals for controlling the gains of third and fourth variable gain amplifiers whose inputs are supplied with the third and fourth output signals of the decoder. Means responsive to the third control signal mix the outputs of the third and fourth variable gain amplifiers and means responsive to the fourth control signal mix the outputs of the first and second variable gain amplifiers.

In the above-described embodiment of the invention the first and second logic circuits which correspond to a wave-matching logic circuit and a front-back logic circuit, respectively, are supplied with signals directly from the output of the decoder and do not require connections to the internal circuitry of the decoder. Thus the decoder may be made separately as an integrated circuit with a minimum number of terminals as compared to prior art circuits of this type. Furthermore in one preferred embodiment of the invention the front-back logic circuit does not contain any time constant circuits and thus the circuit does not interfere with the wavematching logic control to eliminate crosstalk. The logic circuits may easily be made in the form of a single integrated circuit chip without time constant circuits. This greatly decreases the cost of producing a system such as described in this application.

The use of the mixing means allows the outputs of the amplifiers whose gains are not being raised in response to a center signal to be mixed so as to cancel the center signal from the outputs where it does not properly belong. As will be explained in greater detail hereinafter this feature allows the variable gain amplifiers of the $L_F$ and $R_F$ signals, for example, to be raised in response to a $C_F$ signal while the outputs of the amplifiers of the $L_B$ and $R_B$ signals are mixed to cancel the $C_F$ signal from the rear channels.

In one preferred embodiment separate gain control amplifiers are interposed between the input terminals and the rectifying means of the wavematching logic circuit. In this embodiment the front-back logic input signals are supplied directly from the output of two of the gain control amplifiers of the wavematching logic circuit and it is therefore not necessary to provide additional gain control amplifiers solely for the use of the front-back logic circuit.

Accordingly it is an object of the invention to provide an inexpensive multisignal decoding apparatus in which separation between channels is improved.

Another object of the invention is to provide wavematching and front-back logic circuits which may be connected solely to the output terminals of a multisignal decoder.

A still further object of the invention is to provide a decoding system for a multisignal transmission circuit in which both the logic circuits and the decoder may be easily constructed in integrated circuit form.

The foregoing and other objectives, features, and advantages of the invention will be more readily understood upon consideration of the following detailed description of certain preferred embodiments of the invention, taken in conjunction with the accompanying drawings.

DESCRIPTION OF CERTAIN PREFERRED EMBODIMENTS

Figure 1:
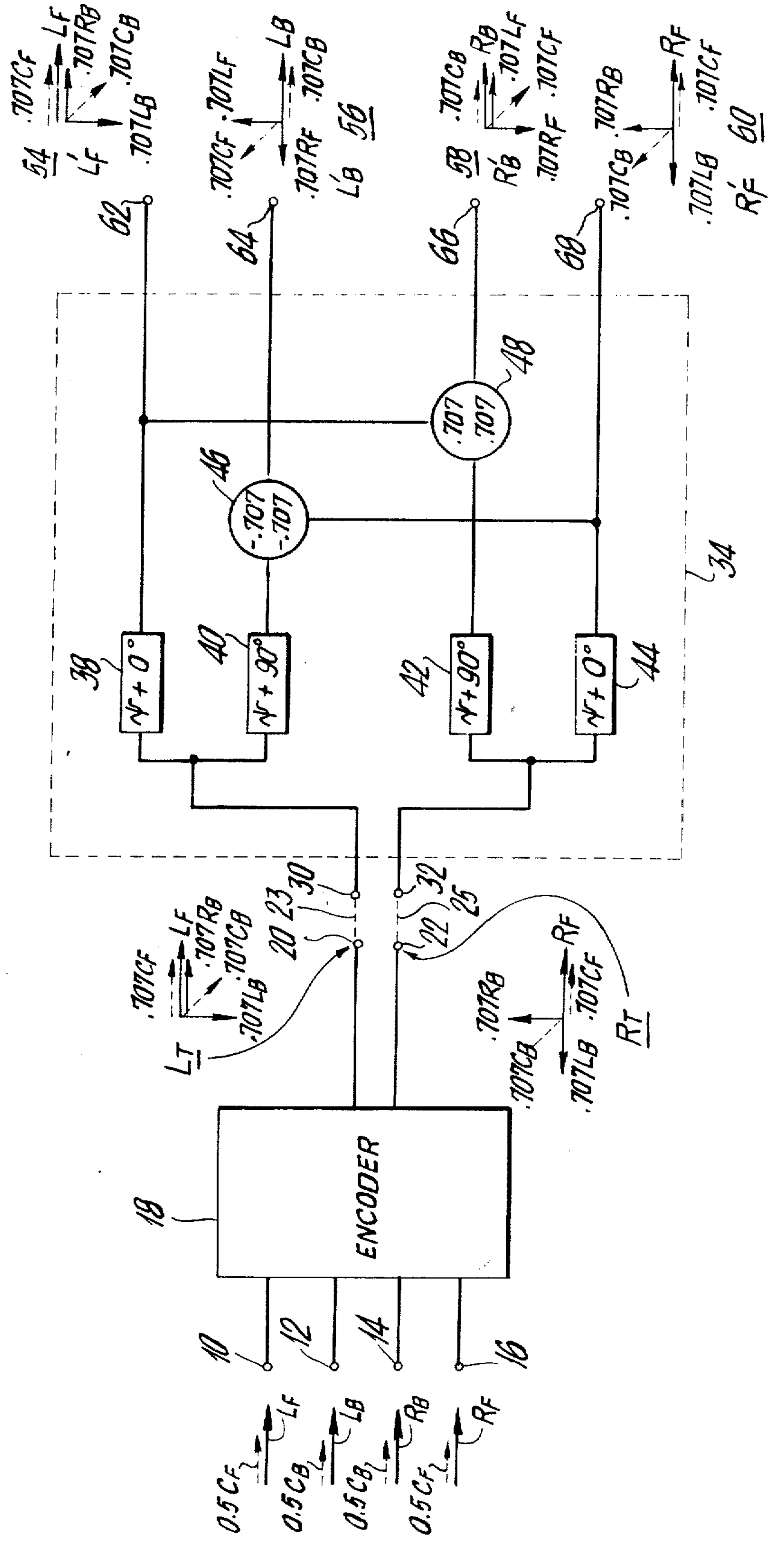
FIG. 1 is a schematic diagram of encoding and decoding circuits of the type with which this invention is intended to be used.

Referring now more particularly to FIG. 1 a quadraphonic sound system is depicted for which the present invention is to be used. An encoder 18 receives left front ($L_F$), left back ($L_B$), right back ($R_B$) and right front ($R_F$) signals at its input terminals 10, 12, 14 and 16, respectively. It also receives a 0.5 portion of a center front ($C_F$) signal at its input terminals 10 and 16 and a 0.5 portion of a center back ($C_B$) signal at its input terminals 12 and 14. The encoder transforms these input signals into two composite output signals designated $L_T$ and $R_T$ at its output terminals 20 and 22, respectively, The phasor components of these signals are represented by the phasor diagrams adjacent the respective terminals. These composite signals may be characterized in complex notation as follows:

$$L_T = L_F - 0.707R_B + j\,(0.707L_B)$$

$$R_T = R_F + 0.707L_B - j\,(0.707R_B)$$ (when $C_F$ and $C_B$ are not present)

The encoded composite signals may thereafter be applied to any suitable two-channel medium as represented by channels 23 and 25, which may be, for example, the two surfaces of the V-shaped groove in a stereophonic record, a two-channel magnetic tape, or an FM multiplex radio channel.

Upon recovery from the two-channel medium the composite signals $L_T$ and $R_T$ are applied to two input terminals 30 and 32, respectively, of a decoder 34. The composite signals are then phase shifted with pairs of $\Psi$ networks 38 and 40 and 42 and 44 to position the phasor components of the composite signals relative to each other in a manner which favors selective addition and subtraction so as to derive four output signals, each containing a predominant component corresponding to one of the original input signals. The basic phase shift angle, $\Psi$, which is introduced by the $\Psi$ networks is a function of frequency.

Thus the network 38 shifts the composite signal $L_T$ by the basic phase shift angle $\Psi$, the $\Psi$ network shifts the composite signal $L_T$ by a phase angle of $\Psi + 90°$, the network 42 shifts the composite signal $R_T$ by a phase angle of $\Psi + 90°$ and the network 44 shifts the composite signal $R_T$ by the basic phase angle $\Psi$. The output from the phase shifter 38 is supplied to an output terminal 62 and the output from the phase shifter 44 is applied to an output terminal 68. A 0.707 portion of the output of the phase shifter 38 is added to 0.707 of the output from the phase shifter 42 and the resultant signal is applied to an output terminal 66 of the decoder 34. Equal negative portions of the outputs of the phase shifters 40 and 44, that is −0.707 of the outputs of the phase shifters 40 and 44 are combined in a summing junction 46 and the resultant signal is applied to the output terminal 64 of the decoder 34.

The first, second, third and fourth output signals appearing at the output terminals 62, 64, 66 and 68 of the decoder 34 predominantly contain the original signals $L_F$, $L_B$, $R_B$ and $R_F$, respectively, and various 0.707 magnitude (−3dB) components of the other signals as depicted by the phasor groups 54, 56, 58 and 60, respectively. These phasor groups have been designated $L_F'$, $L_B'$, $R_B'$ and $R_F'$, respectively.

Figure 2:
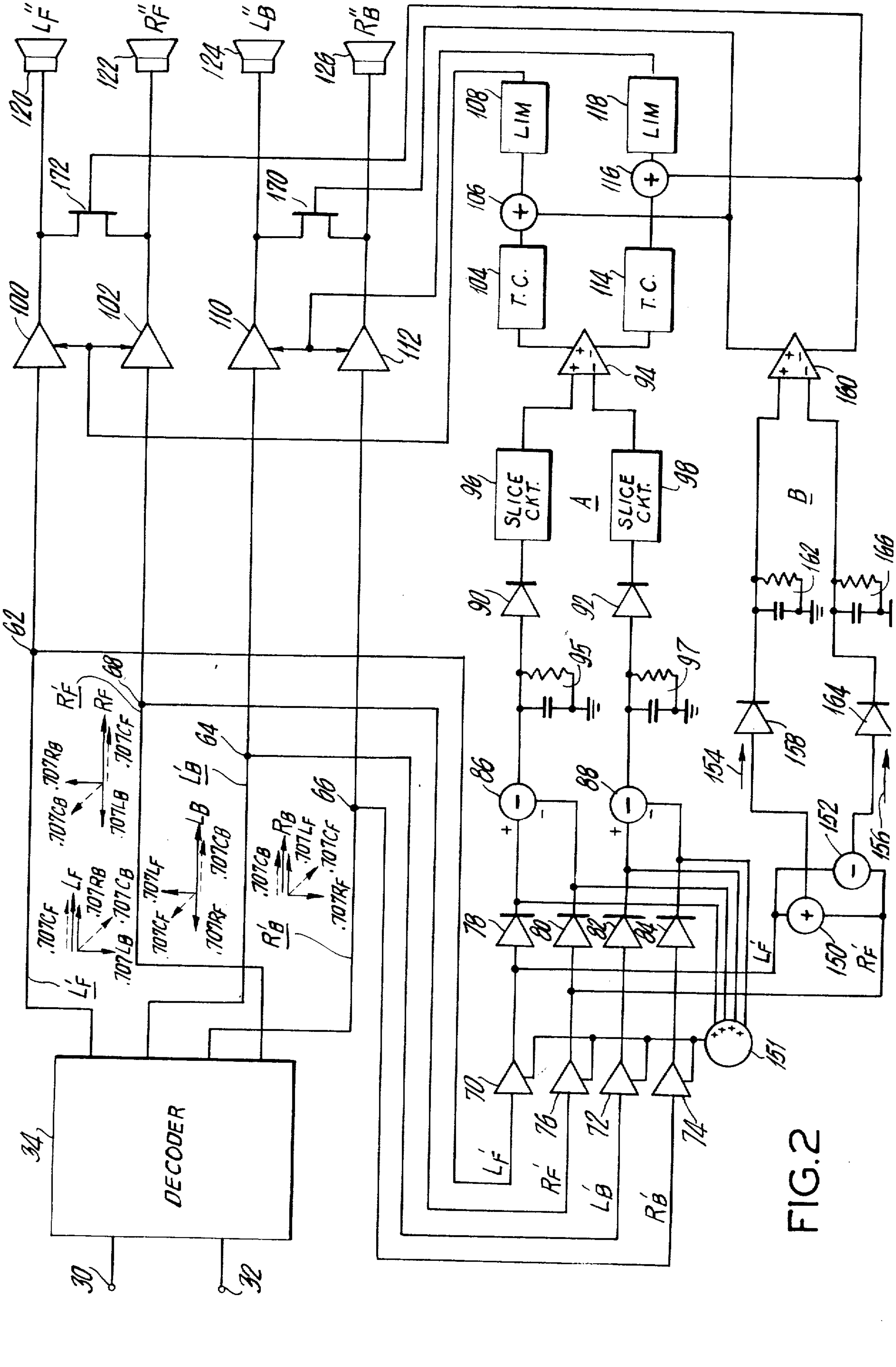
FIG. 2 is a schematic diagram of a decoding apparatus with logic circuitries according to one embodiment of the invention.
Figure 3:
FIGS. 3 and 4 are waveform diagrams of output signals derived at the junction 86 for use in explaining the operation of the circuit depicted in FIG. 2.
Figure 4:

Referring now more particularly to FIG. 2 the audible reproduction of these signals by a circuit according to the invention will now be described. The signals appearing at the output terminals 62, 68, 64 and 66 are applied to the inputs of gain control amplifiers 70, 76, 72 and 74, respectively. The outputs from the gain control amplifiers 70, 76, 72 and 74 are applied to full wave rectifying circuits 78, 80, 82 and 84, respectively. The purpose of the full wave rectifying circuits is to eliminate negative voltages so that a signal with a 180° phase difference is the equivalent of a 0° phase difference for symmetrical signals.

The output from the full wave rectifier 80 is subtracted from the output of the full wave rectifier 78 in a differencing junction 86. The difference signal output of the junction 86 is applied to a full wave rectifier 90 through a time constant circuit 95. The output from the full wave rectifier 90 is applied to a slice (or clipping) circuit 96. The output from the slice circuit 96 is applied to the positive input terminal of a differential amplifier 94. The output from the full wave rectifier 84 is subtracted from the output of the full wave rectifier 82 in a differencing junction 88. The difference signal output from the difference junction 88 is applied to a full wave rectifier 92 through a time constant circuit 97.

The full wave rectified output from the rectifier 92 is applied through a slice circuit 98 to the negative input terminal of the amplifier 94. The output from the full wave rectifiers 78, 80, 82 and 84 are combined in a summing junction 151 and the output signal is used to control the gains of the variable gain amplifiers 70, 76, 72 and 74. The gain control amplifiers 70, 72, 74 and 76 are chosen to have identical or closely similar gain versus control characteristics. The elements 70–94, inclusive, constitute a wave matching logic circuit A.

The above-described elements generate a first, control signal at the positive output terminal of the differential amplifier 94 and this signal is applied through a time constant circuit 104 to a summing junction 106. A second control signal, of the opposite polarity as the first control signal, is produced at the negative output terminal of the differential amplifier 94 and this second control signal is applied thrugh a second time constant circuit 114 to a summing junction 116. The output from the junction 106 is applied through a limiter 108 to the gain control terminals of variable gain amplifiers 100 and 102. The inputs to the amplifiers 100 and 102 are the signals appearing at the outputs 62 and 68, respectively, of the decoder 34.

The second control signal is applied from the junction 116 through a limiter 118 to the variable gain control terminals of variable gain control amplifiers 110 and 112. The inputs to the amplifiers 110 and 112 are derived from the output terminals 64 and 66, respectively, of the decoder 34. The outputs from the amplifiers 100, 102, 110 and 112 are supplied to speakers 120, 122, 124 and 126, respectively. These speakers are located in the left front, right front, left back and right back corner of a listening area.

If it is assumed that the crosstalk components of $L_B$ and $R_B$ are not included in the output signals $L_F'$ and $R_F'$ appearing at the output terminals 62 and 68, respectively, a signal which is either positive ($L_F$ exceeds $R_F$) or negative ($R_F$ exceeds $L_F$) appears at the output of the junction 86. Because the center front signal ($C_F$) components in the $L_F'$ and the $R_F'$ signals are of the same phase and have the same amplitude they are cancelled in the junction 86 and no center front signal appears at the output of the junction 86.

Figure 5:
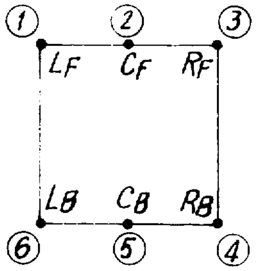
FIG. 5 is a diagrammatic illustration of the sound sources of the original sound field described in the specification.
Figure 6:
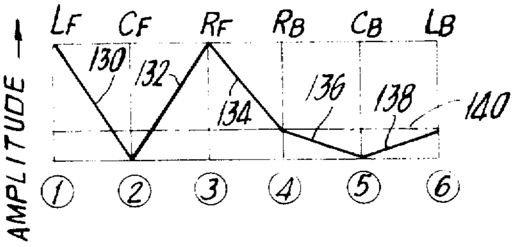
FIG. 6 is a diagrammatic illustration of the magnitude of the output signal from the rectifier 90 in the embodiment depicted in FIG. 2 for variously located sound signal sources.

The difference signal from the junction 86, after rectification by the full wave rectifier 90, is a positive signal. Thus if the sound signal originates at the left front (one) position as shown in FIG. 5, a relatively large positive signal appears at the output of the rectifier 90 (FIG. 6). If only a center front signal predominates (the number two position), no signal appears at the output of the rectifier 90. If a right front ($R_F$) sound signal originates (the third position), a relatively large positive signal appears at the output of the rectifier 90. Thus it can be said that when the original sound is located between positions one and two (left front and center front) the control signal applied to the positive terminal of the differential circuit 94 varies on a line 130 as illustrated in FIG. 6. When the original sound is located between the second and third positions (center front and right front) the control signal varies on a line 132.

Figure 7:
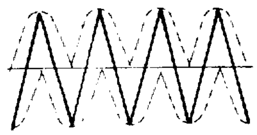
FIG. 7 is a waveform diagram for use in explaining the production of a particular signal at the junction 86 in the embodiment of FIG. 2.

If, on the other hand, the left-front and right-front ($L_F$ and $R_F$) signals are not contained in the $L_F'$ and $R_F'$ signals and only the crosstalk components $L_B$ and $R_B$ are contained therein, only a small magnitude, positive signal appears at the output stage of the rectifier 90. This small positive signal represents the differences of the $L_B$ components in the $L_F'$ and $R_F'$ signals which are 90° apart in phase difference. The combined $L_B$ signal, as depicted in FIG. 7, has a generally triangular-shaped waveform. A similar signal is generated by the differencing of the $R_B$, 90° - phase difference, subdominant signal components. Thus, referring again to FIGS. 5 and 6, when only the right-back signal is generated at position four a small positive signal from the output of rectifier 90 appears. When the sound originates at the center back or fifth position no output signal appears at the rectifier 90 and when the signal originates at the left back or sixth position a small positive signal again appears at the output of the rectifier 90.

Figure 8:
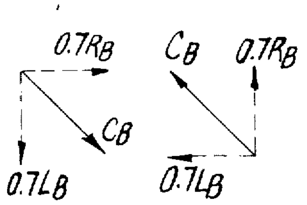
FIG. 8 depicts the phasor components of a center back signal for use in explanation of this invention.

Thus it can be said that the phasor component $C_B$ is synthesized by the subdominant components of $R_B$ and $L_B$ in the $L_F'$ and $R_F'$ signals. However, these two synthesized $C_B$ signals are of the same amplitude and out of phase with each other (as illustrated in FIG. 8) so that they are cancelled in the junction 86.

When the original signal is located between positions three and four (right front and right back), positions four and five (right back and center back), or positions five and six (center back and left back) the control signal appearing at the output stage of the rectifier 90 varies on a curve defined by the lines 134, 136 or 138 as illustrated in FIG. 6. Therefore both the center front and the center back signals components contained in the $L_F'$ and $R_F'$ signals are cancelled in the junction 86 and this feature is of importance in the operation of the logic circuit A. A similar result is obtained for the signals $L_B'$ and $R_B'$.

Figure 9:
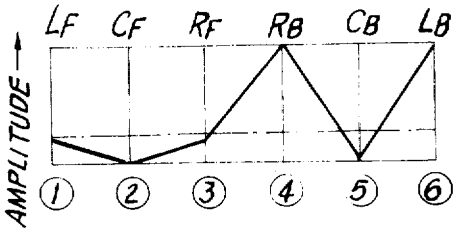
FIG. 9 is a diagrammatic illustration of the magnitude of the output signal from the rectifier 92 in the embodiment of FIG. 2 for variously located sound signal sources.

The amplitude characteristic of the output signal appearing at the output of the rectifier 92 is illustrated in FIG. 9. In a manner similar to that described above the crosstalk components of the center front and center back ($C_F$ and $C_B$, respectively) signals contained in the $L_B'$ and $R_B'$ are cancelled in the junction 88. Thus when the signals are predominant only at the left front or right front positions only a relatively small amount of positive control signal is produced at the output of the rectifier 92.

By suitable selection of the time constants in the time constant circuits 104 and 114 it is possible to reduce this small voltage which is present when only the crosstalk components are contained in the signals $L_F'$, $R_F'$, $L_B'$ and $R_B'$ to zero. Furthermore, since the output signals from the rectifiers 90 and 92 are applied to slice circuits 96 and 98, respectively, the slice levels may be selected (as represented by th line 140 in FIG. 6) to cancel out the subdominant signals. Thus the input signal applied to the positive input of the amplifier 94 represents the difference between the main component $L_F$ in the composite $L_F'$ signal and the main component $R_F$ in the $R_F'$ signal, ie.:

$$\left\| L_F \right| - \left| R_F \right\|$$

Similarly an input signal applied to the negative input terminal of the amplifier 94, by suitable selection of the slice level of the slice circuit 98, will represent the difference between the main component $L_B$ in the $L_B'$ signal and the main component $R_B$ in the $R_B'$ signal or:

$$\left\| L_B \right| - \left| R_B \right\|$$

With these two input signals the output signals at the positive and negative terminals of the amplifier 94 may be designated:

$$\left\| L_F \right| - \left| R_F \right\| - \left\| L_B \right| - \left| R_B \right\|$$

These signals are then applied to the gain control amplifiers 100, 102, 110 and 112 as described above. The two signals will have opposite polarities determined as follows. If the absolute value of the difference between $L_F$ and $R_F$ is larger than the absolute value of the difference between $L_B$ and $R_B$, namely if $$\left\| L_F \right| - \left| R_F \right\| > \left\| L_B \right| - \left| R_B \right\|$$

then the polarity of the signal at the positive output terminal of the amplifier 94 will be such as to increase the gains of the amplifiers 100 and 102 and the polarity of the signal at the negative output terminal of the amplifier 94 will be of the opposite polarity to correspondingly decrease the gains of the amplifiers 110 and 112. Signals which would otherwise be reproduced by the speakers 124 and 126 would therefore not be heard by the listener and crosstalk signal components $L_F$ and $R_F$ contained in the $L_B'$ and $R_B'$ signals are substantially eliminated. Similar results are obtained in the other channels. That is, if the absolute value of the difference between $L_B$ and $R_B$ signal components is larger than the absolute value of the difference between $L_F$ and $R_F$, ie., if $$\left\| L_B \right| - \left| R_B \right| > \left\| L_F \right| - \left| R_F \right\|$$

then an output signal is obtained at the negative output terminal of the amplifier 94 which is of a polarity to increase the gains of the amplifiers 110 and 112 and the control signal at the positive output terminal of the amplifier 94 is of the opposite polarity to decrease the gains of the amplifiers 100 and 102. This substantially eliminates the crosstalk component signals of $L_B$ and $R_B$ in the signals $L_F'$ and $R_F'$.

To re-emphasize the important features of the above-described wavematching logic circuit A, since the components $L_F$ and $R_F$ in the $L_F'$ and $R_F'$ signals, respectively are in phase the center front signal $C_F$ contained therein is cancelled in the junction 86 and likewise since the center back $C_B$ signals contained in the $L_F'$ and $R_F'$ signals are out-of-phase they are also cancelled in the junction 86 (because of a phase difference of 180° appears as a phase difference of zero after full wave rectification). Similarly the signal components $L_B$ and $R_B$ and the signals $L_B'$ and $R_B'$, respectively, are in phase so that the center back $C_B$ signal contained therein is cancelled in the junction 88 as are the center front signals $C_F$ which are out-of-phase with each other and are contained therein. This makes it unnecessary to provide a time constant circuit or circuits between each of the rectifiers 78 and 80 and the junction 86 and between each of the rectifiers 82 and 84 and the junction 88.

Figure 10:
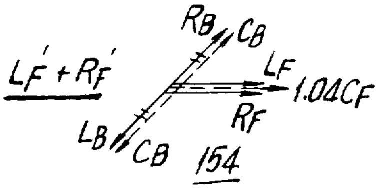
FIGS. 10 and 11 are phasor diagrams representative of the output signals from the summing junction 150 and the subtracting junction 152, respectively.
Figure 11:
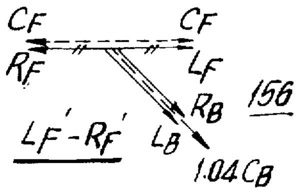

As explained above the wavematching logic circuit A will not produce an output control signal for the center front or the center back signals. Since the center front signal is particularly popular for the placement of solo voices or instruments it is necessary to provide additional, front back logic circuitry B which will recognize these locations. The outputs from the amplifiers 70 and 76 which represent the $L_F'$ and $R_F'$ signals, respectively, are supplied to the inputs of a summing junction 150 and a subtracting junction 152 to produce a sum signal 154 and a difference signal 156, respectively, as shown in FIGS. 10 and 11, respectively. The sum signal 154 is full wave rectified by a rectifier 158 and is integrated by a parallel RC circuit 162 before being applied to the positive input terminal of a differential amplifier 160. The difference signal output from the subtracting junction 152 is full wave rectified by a rectifier 164 and is integrated by a parallel RC circuit 166 before being applied to the negative input terminal of the differential amplifier 160. The circuits 162 and 166 act as time constant circuits. The elements 150, 152, 158, 164, 162, 166 and 160 comprise the front back logic circuit B.

The output signal from the positive terminal of the amplifier 160 constitutes a third control signal which is added to the first control signal in the summing junction 106. It is also applied to the gate electrode of a field effect transistor 170 whose source and drain electrodes are connected between the outputs of the amplifiers 110 and 112. The FET 170 acts as a mixer to mix the outputs of the amplifiers 110 and 112 in response to the third control signal. The output signal derived at the negative output terminal of the amplifiers 160 constitutes a fourth control signal which is added to the second control signal in the summing junction 116 and is also supplied to the gate electrode of a field effect transistor 172 whose source and drain electrodes are connected between the outputs of the amplifier 100 and 102 so that their outputs are mixed in response to the fourth control signal.

It should be noted that in the summing signal 154 (FIG. 10) the $L_F$ and $R_F$ signal components are in phase but the $R_B$ and $L_B$ signals are out-of-phase. Therefore a center back signal $C_B$ (if present) is cancelled in the junction 150 but a center front signal (if present) will nevertheless be obtained. On the other hand, in the difference signal 156 (FIG. 11) the $L_F$ and $R_F$ signal components are out-of-phase but the $L_B$ and $R_B$ signal components are in phase so that if the center front signal is present it is cancelled in the junction 152 and the center back signal $C_B$, if present, is obtained.

Thus if a center front signal is present, a signal of a polarity which will increase the gains of the amplifiers 100 and 102 appears at the positive output terminal 160 if $$\left| L_F' + R_F' \right| - \left| L_F' - R_F' \right| > 0$$

and this third control signal is applied to the gain control of the amplifiers 100 and 102 so as to increase their gains and increase the loudness of the sounds produced in the left front and right front speakers 120 and 122, respectively. Furthermore the third control signal is applied to the gate electrode of the FET 170 so that the center front signals contained in the signal $L_B'$ and $R_B'$ are mixed and cancelled. A signal of the opposite polarity is developed at the negative output terminal of the amplifier 160 which decreases the gains of the amplifiers 110 and 112 and makes the FET 172 essentially non-conductive.

If on the other hand, the center back signal is present then a signal of a polarity which will increase the gains of the amplifiers 110 and 112 appears at the negative output terminal of the amplifier 160 and this fourth control signal causes the gain of the amplifiers 110 and 112 to increase and the signal outputs from the amplifiers 100 and 102 to be mixed so that the center back signals contained in the signals $L_F'$ and $R_F'$ are cancelled. A signal of the opposite polarity is developed at the positive output terminal of the amplifier 160 which decreases the gains of the amplifiers 100 and 102 and makes the FET 170 essentially non-conductive.

Thus according to this invention the circuit elements of the decoder 34 may be formed on only one semiconductive substrate. Furthermore the circuit elements of wavematching logic circuit A and the front back logic circuit B may be formed on only one semiconductive substrate without external time constant circuits. This greatly facilitates the manufacture of the decoding sound signal system in integrated circuit form.

Furthermore the mixing FETS 170 and 172 connected to the front back logic circuit B eliminate center signals from the (back or front) channels in which they do not properly belong at the same time as the gains of the amplifiers in the proper (front or back) channels are increased and the gains of the amplifiers in the improper (back or front) channels are decreased. In contrast to some prior art front-back logic circuits the signal mixing feature of the present invention allows the reductions in the gains of the amplifiers in the improper channels to be less than in such prior art circuits so that the dominant signals are not also reduced to a subaudible level.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

What is claimed is:

1. Four channel stereo system decoder apparatus for converting first and second composite signals $L_T$ and $R_T$ respectively containing, dominant left-front ($L_F$) and right-front ($R_F$) signal components, each including side-effect left-back ($L_B$) and right-back ($R_B$) signal components, if present, and wherein the $L_B$ signal components have substantially equal magnitudes and are in substantially quadrature relationship with each other in the $L_T$ and $R_T$ composite signals and the $L_B$ signal component in one of the $L_T$ and $R_T$ composite signals is in leading relationship with the $L_B$ component in the other of the $L_T$ and $R_T$ composite signals and wherein the $R_B$ signal components have substantially equal magnitudes and are in substantially quadrature relationship with each other in the $L_T$ and $R_T$ composite signals and the $R_B$ signal component in one of the $L_T$ and $R_T$ composite signals is in lagging relationship with the $R_B$ signal component in the other of the $L_T$ and $R_T$ composite signals, into four separate output signals designated as first, second, third and fourth output signals, respectively predominantly containing $L_F$, $R_F$, $L_B$ and $R_B$ signal components, respectively, the apparatus comprising in combination: a decoding matrix having first and second input terminals to which the $L_T$ and $R_T$ composite signals are respectively applied, first, second, third and fourth output terminals at which the first, second, third and fourth output signals appear; a plurality of phase-shifting networks and a plurality of combining networks connected to each other between the input terminals and the output terminals and being operative to transfer substantially equal amounts of $L_F$, $R_F$, $L_B$ and $R_B$ signal components as dominant signals in phase with each other to the first, second, third and fourth output terminals, respectively, the $L_F$ and $R_F$ dominant signals each being accompanied by lower amplitude, quadrature related $L_B$ and $R_B$ signal components with the $L_B$ components accompanying each one of the dominant $L_F$ and $R_F$ signals being in phase opposition to the $R_B$ components accompanying the other of the dominant $L_F$ and $R_F$ signals and the $L_B$ and $R_B$ dominant signals each being accompanied by lower amplitude, quadrature related $L_F$ and $R_F$ signal components with the $L_F$ signal components accompanying each one of the dominant $L_B$ and $R_B$ signals being in phase opposition to the $R_F$ signal components accompanying the other of the $L_B$ and $R_B$ signals; first, second, third and fourth variable transmission means connected to the first, second, third and fourth output terminals, respectively, of the decoding matrix; first logic means having first, second, third and fourth input terminals connected to the first, second, third and fourth output terminals, respectively, of the decoding matrix, the first logic means including first, second, third and fourth rectifiers for full wave rectifying the signals appearing at the first, second, third and fourth input terminals of the first logic means, respectively, first subtracting means for subtracting the second rectified signal from the first rectified signal to produce a first difference signal, second subtracting means for subtracting the fourth rectified signal from the third rectified signal to produce a second difference signal and first comparing means for comparing the magnitudes of the first and second difference signals to produce first and second control signals; second logic means having means for receiving the signals applied to the first and second input terminals of the first logic means, combining means for combining the signals received by the second logic means, third subtracting means for subtracting the signal received from the second input terminal of the first logic means from the signal received from the first input terminal of the first logic means, fifth and sixth rectifiers for full wave rectifying the output signals derived from the combining means and the third subtracting means, respectively, and second comparing means for comparing the magnitudes of the output signals derived from the fifth and sixth rectifying means and for producing third and fourth control signals; and means for selectively applying the first, second, third and fourth control signals to the first, second, third and fourth variable transmission means to substantially eliminate crosstalk signal components from the signals transmitted by said first, second, third and fourth variable transmission means.

2. A multisignal decoding aparatus comprising matrix means for receiving first and second composite signals $L_T$ and $R_T$, respectively, containing dominant left-front ($L_F$) and right-front ($R_F$) signal components and each including subdominant left-back ($L_B$) and right back ($R_B$) signal components, the $L_B$ signal components having substantially equal magnitudes and the $L_B$ signal component in the $L_T$ signal being in substantially lagging quadrature relationship with the $L_B$ signal component in the $R_T$ signal, the $R_B$ signal components having substantially equal magnitude and the $R_B$ signal component in the $L_T$ signal being in substantially leading quadrature relationship with the $R_B$ signal component in the $R_T$ signal; the composite $L_T$ and $R_T$ signals further being converted by the matrix means into first, second, third and fourth separate output signals predominantly containing $L_F$, $R_F$, $L_B$ and $R_B$ signal components, respectively, the first and second output signals containing subdominant signal components of the $L_B$ and $R_B$ signal which are in quadrature relationship with each other, the $L_B$ signal component in each one of the first and second output signals being in phase opposition to the $R_B$ signal component in the other of the first and second output signals, the third and fourth output signals containing subdominant lower amplitude, quadrature related $L_F$ and $R_F$ signal components, the $L_F$ signal component in each one of the third and fourth output signals being in phase opposition to the $R_F$ signal component in the other of the third and fourth output signals; first, second, third and fourth variable transmission means each having separate input and output terminals; first, wavematching logic means including first, second, third and fourth input terminals; means for supplying the first, second, third and fourth output signals to the inputs of both the first, second, third and fourth variable transmission means and the first, second, third and fourth input terminals of the first logic means, respectively; the first logic means further including means for separately rectifying the first, second, third and fourth signals applied to the corresponding input terminals of the first logic means, means for subtracting the second rectified input signal from the first rectified input signal to produce a first difference signal and for subtracting the fourth rectified input signal from the third rectified input signal to produce a second difference signal, and means for comparing the magnitudes of the first and second difference signals for producing first and second control signals of opposite polarities; second, front-back logic means including means for producing signals representative of the sum and difference of the signals applied to the first and second input terminals of the first logic means, and means for comparing the magnitudes of these sum and difference signals to produce third and fourth control signals of opposite polarities; means for combining the first and third control signals to simultaneously control the transmissive characteristics of the first and second variable transmission means; means for combining the second and fourth control signals to simultaneously control the transmissive characteristics of the third and fourth variable transmission means; means responsive to the third control signal for mixing the outputs of the third and fourth variable transmission means and means responsive to the fourth control signal for mixing the outputs of the first and second variable transmission means.

3. A multisignal decoding apparatus as recited in claim 2 wherein the first, second, third and fourth variable transmission means comprise variable gain amplifiers whose gains are controlled by the respective control signals.

4. In combination with apparatus for decoding two channels of audio information embodied in $L_T$ and $R_T$ composite signals, respectively, the $L_T$ signal containing a left-front signal ($L_F$) having a predetermined amplitude and a zero reference phase, a left-back signal ($L_B$) having a −3dB relative amplitude and −90° relative phase, and a right-back signal ($R_B$) having a −3dB relative amplitude and a zero reference phase; the $R_T$ signal containing a right-front signal ($R_F$) having a predetermined amplitude and a zero reference phase, a right-back signal ($R_B$) having a −3dB relative amplitude and a +90° relative phase and a left-back signal ($L_B$) having a −3dB relative amplitude and a 180° relative phase, the decoding apparatus including phase shift matrixing means for converting $L_T$ and $R_T$ composite signals into first, second, third and fourth output signals having predominant signal components of $L_F$, $R_F$, $L_B$ and $R_B$, respectively, each at a zero relative phase angle, the first output signal further containing a −3dB $R_B$ signal component at zero relative phase and a −3dB $L_B$ signal component at −90° relative phase, the second output signal containing a −3dB $R_B$ signal component at +90° relative phase and a −3dB $L_B$ signal component at 180° relative phase, the third output signal containing a −3dB $L_F$ signal component at +90° and a −3dB $R_F$ signal component at 180° relative phase, and the fourth output signal containing a −3dB $L_F$ signal component at 0° relative phase and a −3dB $R_F$ signal component at −90° relative phase; first, second, third and fourth variable gain amplifiers whose inputs are supplied with the first, second, third and fourth output signals of the phase shift matrixing means; first logic means having first, second, third and fourth input terminals, means for supplying the first, second, third and fourth output signals from the phase shift matrixing means to the first, second, third and fourth input terminals of the first logic means, respectively, first, second, third and fourth rectifying means connected to the first, second, third and fourth input terminals, respectively, of the first logic means for full wave rectifying the respective output signals supplied to the first logic means, first differencing means for subtracting the full wave rectified second output signal from the full wave rectified first output signal to produce a first difference signal, second differencing means for subtracting the full wave rectified fourth output signal from the full wave rectified third output signal to produce a second difference signal, fifth means for full wave rectifying the first difference signal, sixth means for full wave rectifying the second difference signal, differential amplifier means for comparing the magnitudes of the full wave rectified second difference signal with the full wave rectified first difference signal to produce first and second control signals having opposite polarities; second logic means having fifth and sixth input terminals connected to the first and second input terminals of the first logic means, respectively, first summing means for combining the signals applied to the fifth and sixth input terminals to produce a first sum signal, third differencing means for subtracting the signal applied to the sixth input terminal from the signal applied to the fifth input terminal of the second logic means to produce a third difference signal, seventh full wave rectifying means for full wave rectifying the first sum signal, eight full wave rectifying means for full wave rectifying the third difference signal, second differential amplifier means for comparing the magnitude of the first full wave rectified sum signal with the magnitude of the third full wave rectified difference signal to produce third and fourth control signals having opposite polarities; means for adding the third control signal to the first control signal to produce a fifth control signal, means for supplying the fifth control signal to simultaneously control the gains of the first and second variable gain amplifiers, means for combining the fourth control signal with the second control signal to produce a sixth control signal, means for supplying the sixth control signal to simultaneously control the gains of the third and fourth variable gain amplifiers; first mixing means responsive to the fourth control signal and connected between the outputs of the first and second variable gain amplifiers, and second mixing means responsive to the third control signal and connected between the outputs of the third and fourth variable gain amplifiers.

5. The combination as recited in claim 4 further comprising fifth, sixth, seventh and eighth variable gain amplifiers interposed between the first, second, third and fourth input terminals of the first logic means and the first, second, third and fourth output terminals of the phase shift matrixing means, respectively, second summing means supplied with the outputs of the first, second, third and fourth full wave rectifying means to produce a combined seventh control signal for simultaneously controlling the gains of the fifth, sixth, seventh and eighth variable gain amplifiers.

6. The apparatus as recited in claim 4 wherein the phase shift matrixing means is manufactured as a first integrated circuit and the first and second logic means are manufactured as a second combined integrated circuit.

7. The combination as recited in claim 4 wherein the first and second mixing means comprise field effect transistors whose source and drain electrodes are connected to the respective outputs of the variable gain amplifiers and whose gate electrodes are supplied with the respective fifth and sixth control signals.

8. The combination as recited in claim 4 wherein first, second, third and fourth means are provided for audibly reproducing the outputs of the first, second, third and fourth variable gain amplifiers, respectively, at left-front, right-front, left-back and right-back positions, respectively, of a listening area.

* * * * *